US 011117429B2

(12) United States Patent
Plattier et al.

(10) Patent No.: US 11,117,429 B2
(45) Date of Patent: Sep. 14, 2021

(54) TIRE WITH SENSOR ATTACHMENT RESERVOIR AND METHOD OF ATTACHING SENSOR

(71) Applicant: The Goodyear Tire & Rubber Company, Akron, OH (US)

(72) Inventors: Julien Plattier, Beringen (LU); Jean-Claude Patrice Philippe Griffoin, Mertzig (LU); Jason Mark Middelberg, Lintgen (LU); Kevin Erik M. Pierret, Bastogne (BE); Etienne Marie Willy Legrand, Diekirch (LU); Olivier Jean-Pierre Richard, Fratin (BE); Mike Klein, Bissen (LU); Benoit Julien A. Debout, Bastogne (BE); Andreas Frantzen, Trier (DE); Laurent Roger Andre Dubos, Niederfeulen (LU); Lothar Braun, Bollendorf (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 289 days.

(21) Appl. No.: 16/186,798

(22) Filed: Nov. 12, 2018

(65) Prior Publication Data

US 2019/0193490 A1    Jun. 27, 2019

Related U.S. Application Data

(60) Provisional application No. 62/608,621, filed on Dec. 21, 2017.

(51) Int. Cl.
*B60C 23/04* (2006.01)
*B29D 30/00* (2006.01)

(52) U.S. Cl.
CPC ...... *B60C 23/0493* (2013.01); *B29D 30/0061* (2013.01); *B29D 2030/0077* (2013.01)

(58) Field of Classification Search
None
See application file for complete search history.

(56) References Cited

U.S. PATENT DOCUMENTS

| | | | |
|---|---|---|---|
| 4,242,671 A | 12/1980 | Plows | |
| 4,334,215 A | 6/1982 | Frazier et al. | |
| 4,578,992 A | 4/1986 | Galasko et al. | |
| 5,479,171 A | 12/1995 | Schuermann | |
| 5,483,827 A | 1/1996 | Kulka et al. | |
| 5,500,065 A | 3/1996 | Koch et al. | |
| 5,562,787 A * | 10/1996 | Koch | B60C 23/0493 156/64 |
| 5,573,611 A | 11/1996 | Koch et al. | |

(Continued)

*Primary Examiner* — Timothy Kennedy
*Assistant Examiner* — Olukorede Esan
(74) *Attorney, Agent, or Firm* — Edward T. Kennedy (57) ABSTRACT

A tire with a sensor attachment reservoir is provided. The tire includes a pair of bead areas, a sidewall extending from each respective bead area to a tread, a carcass extending toroidally between each of the bead areas, and an innerliner disposed inwardly of the carcass. A compound ring is secured to the innerliner, and the compound ring defines a reservoir upon being secured to the innerliner. A sensor adhesive is disposed in the reservoir and a sensor is secured to the tire innerliner by the sensor adhesive. A corresponding method of attaching a sensor to a tire is also provided.

17 Claims, 7 Drawing Sheets

(56) References Cited

U.S. PATENT DOCUMENTS

| | | | |
|---|---|---|---|
| 5,731,754 A | | 3/1998 | Lee, Jr. et al. |
| 5,749,984 A | * | 5/1998 | Frey ...................... B60C 23/064 |
| | | | 152/152.1 |
| 5,960,844 A | | 10/1999 | Hamaya |
| 5,971,046 A | * | 10/1999 | Koch ............... G06K 19/07764 |
| | | | 152/152.1 |
| 5,977,870 A | | 11/1999 | Rensel et al. |
| 6,030,478 A | | 2/2000 | Koch et al. |
| 6,309,494 B1 | | 10/2001 | Koch et al. |
| 6,668,884 B2 | | 12/2003 | Koch et al. |
| 6,788,192 B2 | | 9/2004 | Shimura |
| 6,860,303 B2 | | 3/2005 | Rensel et al. |
| 7,132,930 B2 | | 11/2006 | Wilson et al. |
| 7,186,308 B2 | | 3/2007 | Metcalf et al. |
| 7,318,464 B2 | | 1/2008 | Hahn et al. |
| 7,353,720 B2 | | 4/2008 | Sinnett |
| 7,398,810 B2 | | 7/2008 | Peyron et al. |
| 7,510,618 B2 | | 3/2009 | Koch |
| 7,598,877 B2 | | 10/2009 | Lionetti |
| 8,022,817 B2 | | 9/2011 | Wilson et al. |
| 8,157,172 B2 | | 4/2012 | Fenkanyn |
| 2004/0140030 A1 | * | 7/2004 | Hahn ...................... B60C 19/00 |
| | | | 152/152.1 |
| 2004/0159383 A1 | | 8/2004 | Adamson et al. |
| 2005/0274448 A1 | * | 12/2005 | Lettieri ................ H01Q 1/2241 |
| | | | 156/110.1 |

\* cited by examiner

TIRE WITH SENSOR ATTACHMENT RESERVOIR AND METHOD OF ATTACHING SENSOR

FIELD OF THE INVENTION

The invention relates to tires. More particularly, the invention relates to electronic components that sense various conditions within tires. Specifically, the invention is directed to a tire that includes a reservoir defining an area which contains an adhesive for the attachment of a sensor, and to a method of attaching the sensor to the tire.

BACKGROUND OF THE INVENTION

In the manufacture of a tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

For many modern tires, it is often desirable to mount electronic sensor units to the tires either before or after curing. Such sensor units enable the temperature, pressure and/or other parameters of the tire to be monitored during vehicle operation. All modern electronic sensor units include an integrated circuit that processes and stores information. One or more sensors are integrated with or electronically connected to the integrated circuit. An antenna for receiving and transmitting a signal to an external reader is also electronically connected to the integrated circuit, and may be carried on a substrate with the integrated circuit. For the purpose of convenience, electronic sensor units with such a construction will be referred to herein as sensors.

Such sensors typically are housed in a rigid or semi-rigid polymer housing to protect the integrity of the integrated circuit, sensor and/or antenna, and commonly are about 5 to 10 millimeters (mm) thick by about 20 to 25 mm in diameter. Due to the size of the sensor, the nature of the construction of the components of the sensor, and the nature of the construction of the tire, the sensors have typically been attached to the inside surface of a pneumatic tire, which is referred to as the innerliner. Such a location has enabled the sensors to continuously sense parameters such as the temperature and pressure inside the tire cavity, while not interfering with the structure of the tire.

However, mounting the rigid or semi-rigid housing of the sensor to the tire innerliner has traditionally been complex and/or expensive due to the different materials used for the sensor housing and the tire innerliner, as well as the harsh environment inside the tire. For example, the sensors must remain adhered to the tire innerliner for a long period of time under conditions that include high and low temperatures, high rotational speeds, continuous deflection of the tire, and the like.

As a result, it is desirable to develop a tire that includes a structure that enables a sensor to be attached to the tire innerliner in a simple and economical manner while withstanding the conditions in the tire, and an accompanying method of attaching the sensor to the tire.

SUMMARY OF THE INVENTION

According to an aspect of an exemplary embodiment of the invention, a tire with a sensor attachment reservoir is provided. The tire includes a pair of bead areas, a sidewall extending from each respective bead area to a tread, a carcass extending toroidally between each of the bead areas, and an innerliner disposed inwardly of the carcass. A compound ring is secured to the innerliner, and the compound ring defines a reservoir upon being secured to the innerliner. A sensor adhesive is disposed in the reservoir and a sensor is secured to the tire innerliner by the sensor adhesive.

According to an aspect of another exemplary embodiment of the invention, a method of attaching a sensor to a tire is provided. The method includes the step of providing a tire, in which the tire includes a pair of bead areas, a sidewall extending from each respective bead area to a tread, a carcass extending toroidally between each of the bead areas, and an innerliner disposed inwardly of the carcass. A compound ring is secured to the innerliner, in which the compound ring defines a reservoir upon being secured to the innerliner. A sensor adhesive is disposed in the reservoir, and a sensor is secured to the tire innerliner with the sensor adhesive.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Piezoelectric Sensor" means a device that uses the piezoelectric effect actuated by mechanical stress, such as a bending of the body of a component, to power the sensor and/or to measure pressure, acceleration, strain and/or force.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"Radial-ply tire" means a belted or circumferentially-restricted pneumatic tire in which the ply cords which extend from bead to bead are laid at cord angles between about 65 to about 90 degrees with respect to the equatorial plane of the tire.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

Figure 1:
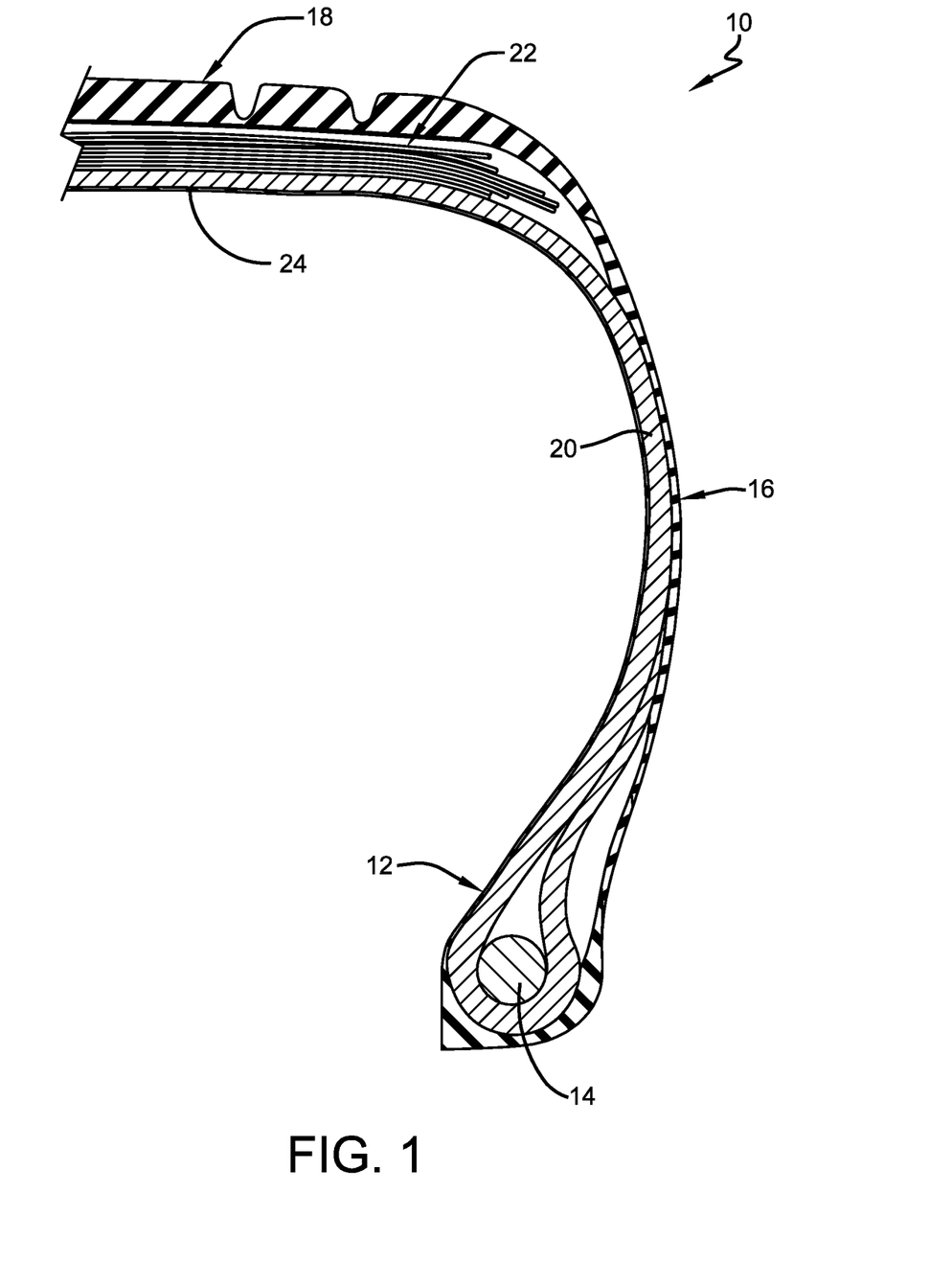
FIG. 1 is a schematic cross-sectional view of one-half of an exemplary embodiment of the tire of the present invention prior to application of sensor attachment components.

An exemplary embodiment of the tire of the present invention is indicated generally at 10, and is shown in FIG. 1. The tire 10 is a cured or vulcanized tire, and includes a bead area 12 and a bead core 14 embedded in the bead area. A sidewall 16 extends radially outward from the bead area 12 to a ground-contacting tread 18. The tire 10 is reinforced by a carcass 20 that toroidally extends from one bead area 12 to a second bead area (not shown), as known to those skilled in the art. The carcass 20 includes at least one ply that preferably winds around each bead core 14. A belt reinforcement package 22 is disposed between the carcass 20 and the tread 18, and may employ specific configurations as desired. An innerliner 24 is disposed inwardly of the carcass 20 and forms the inside surface of the tire 10.

Figure 8:
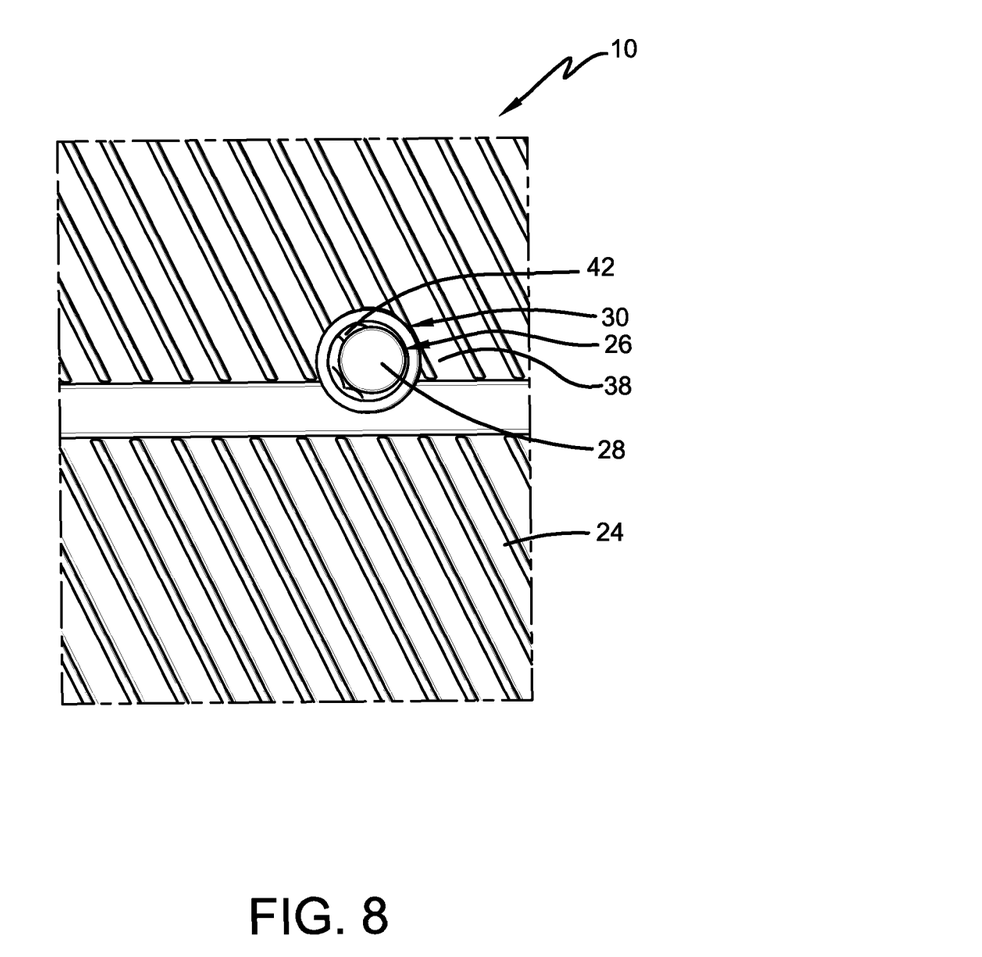
FIG. 8 is a fragmentary plan view of the tire, attachment components and adhesive shown in FIG. 7 with a sensor secured to the tire innerliner.

An exemplary electronic sensor unit 26 is shown in FIG. 8. The electronic sensor unit 26 includes an integrated circuit and at least one of a temperature sensor, a pressure sensor, a wear sensor, a force sensor, a strain sensor and an acceleration sensor. The electronic sensor unit 26 preferably includes an antenna for receiving and transmitting a signal to an external reader and a memory module for storing information that identifies the tire 10 through an identification code and/or tire type, manufacturing location and the like. In addition, the electronic sensor unit 26 preferably includes a power source, such as a non-rechargeable battery, rechargeable battery, capacitor, supercapacitor or energy harvesting structure. In this manner, the electronic sensor unit 26 is a self-contained unit housed within a rigid or semi-rigid housing 28. For the purpose of convenience, electronic sensor units with such a construction will be referred to herein as a sensor 26. The sensor 26 may be a piezoelectric sensor, which employs a piezoelectric effect to measure pressure, acceleration, strain and/or force.

The invention includes a structure and a method of economically attaching the sensor 26 to the tire innerliner 24 which enables the attachment to withstand the harsh conditions inside the tire 10, and particularly high vehicle speed or high rotational speed of the tire. Preferably, the attachment is performed after the tire 10 has been cured or vulcanized to prevent potential damage to the sensor 26.

To ensure proper attachment, the innerliner 24 is cleaned. More particularly, when the tire 10 is cured or vulcanized in a mold or press, curing aids and/or release agents are often employed, and may still be present on the surface of the innerliner 24. To remove such curing aids and/or release agents, a laser cleaning device as known to those skilled in the art preferably is used to clean the surface of the innerliner 24. For example, the laser cleaning device may operate by ablating undesirable material or agents through interaction of a beam from the laser cleaning device with the innerliner 24. The laser cleaning device may be used on the entire surface of the innerliner 24, or a specific area of the innerliner where the sensor 26 is to be attached. Alternatively, other cleaning techniques may be employed, such as mechanical techniques that include buffing, application of high pressure water, application of dry ice and/or application of cleaning solvents.

Turning to FIGS. 2 through 5, once the tire innerliner 24 is cleaned, a compound ring 30 is secured to the innerliner 24 at a predetermined location. The compound ring 30 includes a body 32 that preferably is formed of an elastomer and is cured prior to securing to the innerliner 24. Preferably, the compound ring body 32 is formed of a material that is similar to the material of the innerliner 24 for compatibility with the innerliner. For example, a natural rubber-based compound containing carbon black may be employed for the compound ring body 32.

The compound ring 30 is formed with a shape, inner dimension, and height or body cross-sectional dimension that correspond to the housing 28 of the sensor 26 (FIG. 8). For example, when the sensor housing 28 is a disc about 5 mm thick by about 25 mm in diameter, the body 32 of the ring 30 preferably is formed with a disc-shaped, open center configuration. For example, the ring body 32 may be of a toroidal shape that includes a square or rectangular cross section, or a torus, which includes a round cross section. The inner diameter of the body 32 preferably provides at least 2 mm of clearance around the sensor housing 28, and more preferably at least 5 mm of clearance. To retain an adhesive, which will be described in greater detail below, the body 32 includes a height for a square or rectangular cross section, or a cross-sectional diameter for a round cross section, which is at least half of the height of the sensor housing 28. Thus, when the sensor housing 28 is about 5 mm thick, the height or the cross-sectional diameter of the body 32 of the ring 30 is at least 2.5 mm.

Figure 2:
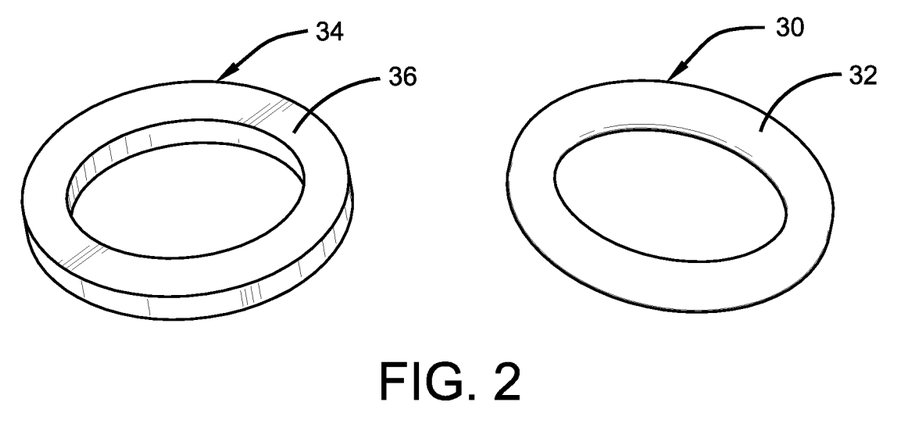
FIG. 2 is a perspective view of an exemplary embodiment of sensor attachment components for the tire of the present invention.
Figure 3:
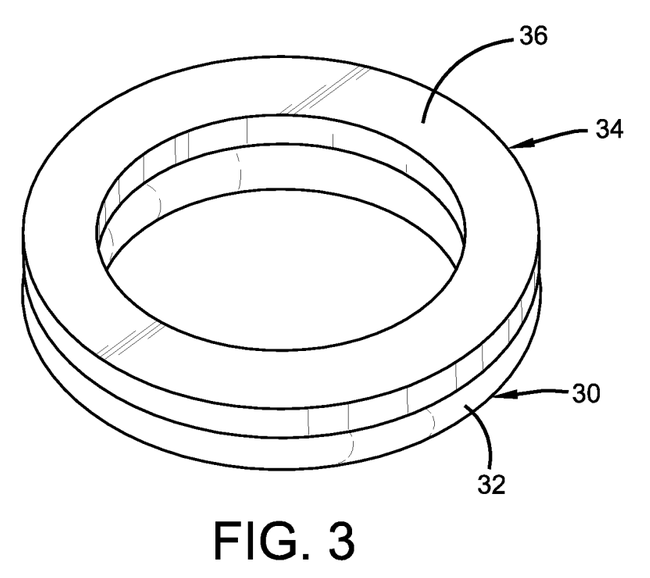
FIG. 3 is an enlarged bottom perspective view of the components shown in FIG. 2, in a stacked configuration.

An adhesive ring 34 secures the compound ring 30 to the tire innerliner 24. More particularly, the adhesive ring 34 is formed of a green or unvulcanized compound that is capable of being vulcanized. Such a green compound structure enables the adhesive ring 34 to be easily handled and placed in alignment with the compound ring 30. Preferably, the adhesive ring 34 is formed of a material such as a fast-curing compound to enable complete curing of the adhesive ring, as will be discussed in greater detail below. In addition, the adhesive ring 34 preferably is formed of a material that is compatible with the innerliner 24. For example, a natural rubber-based compound containing carbon black with increased curing agent content may be employed for the adhesive ring 34.

The adhesive ring 34 is formed with a shape and size that corresponds to the compound ring 30. For example, when the compound ring 30 includes a toroidally-shaped body 32, the adhesive ring 34 is formed with a toroidally-shaped body 36. Preferably, the cross-sectional shape of the adhesive ring body 36 corresponds to the cross-sectional shape of the compound ring body 32. For example, when the compound ring body 32 includes a square or rectangular cross section, the adhesive ring body 36 also includes a square or rectangular cross section. The inner diameter of the adhesive ring body 36 is approximately the same as the inner diameter of the compound ring body 32. Preferably, the cross-sectional width of the adhesive ring body 36 is approximately the same as or slightly larger than the cross-sectional diameter of the body 32. The cross-sectional height of the adhesive ring body 36 is at least 0.5 mm, and preferably about 1 mm to about 2 mm, which provides ready handling of the adhesive ring 34 and sufficient adhesive to secure the compound ring 30 to the tire innerliner 24.

Figure 4:
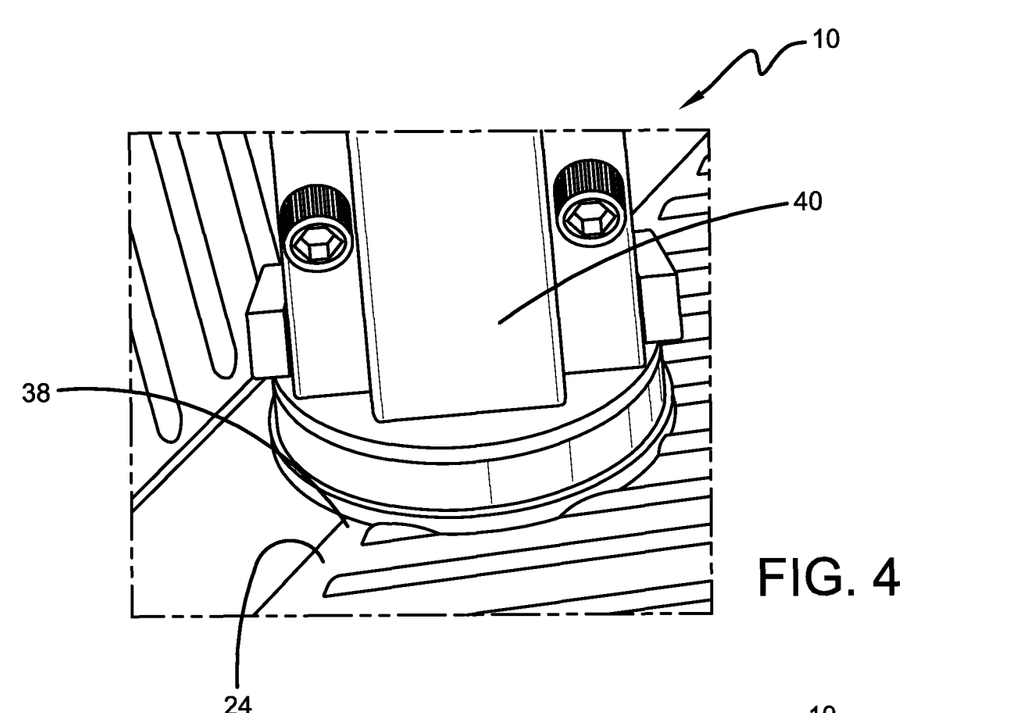
FIG. 4 is a fragmentary perspective view of the exemplary embodiment of the tire and attachment components of the of present invention with a vulcanizing apparatus.
Figure 5:
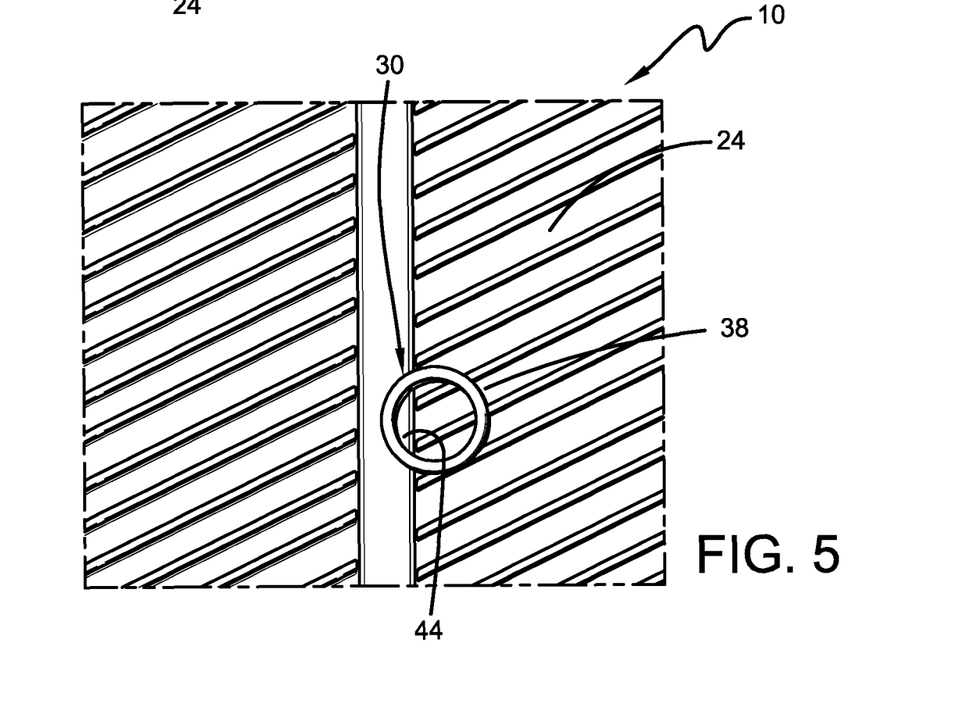
FIG. 5 is a fragmentary plan view of the components shown in FIG. 2 as attached to the tire shown in FIG. 4.

To secure the compound ring 30 to the tire innerliner 24, the adhesive ring 34 is disposed on an area 38 of the tire innerliner 24 that has been cleaned as described above. The compound ring 30 is disposed on the adhesive ring 34 in radial alignment with the adhesive ring. The compound ring 30 is secured to the innerliner 24 preferably by vulcanizing the adhesive ring 34, which causes the adhesive ring to cure against the compound ring and the innerliner, thereby providing a strong adhesive connection between the compound ring and the tire innerliner. For example, a vulcanization tool or device 40 may be disposed against the innerliner 24 about the compound ring 30 and the adhesive ring 34. The vulcanization tool 40 heats the compound ring 30 and adhesive ring 34 to about 140 degrees Celsius (degrees C.), which is about 284 degrees Fahrenheit (degrees F.), and increases the pressure at the compound ring and the adhesive ring from atmospheric pressure or about 1 bar to about 4 bar, and holds these conditions for about 10 minutes.

Figure 6:
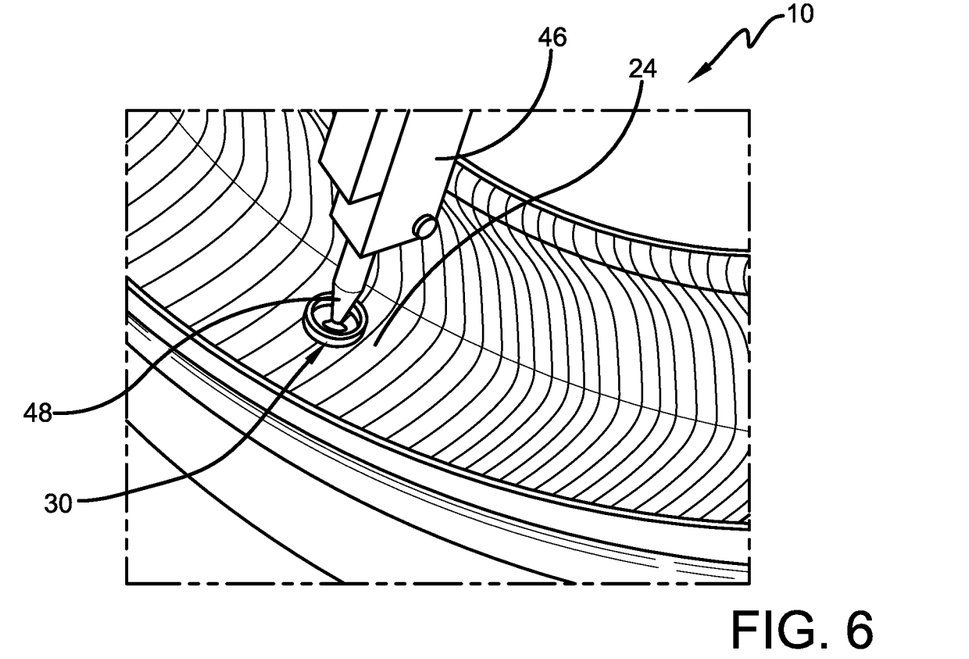
FIG. 6 is a fragmentary perspective view of the tire and attachment components shown in FIG. 5 with an apparatus applying adhesive to the tire.
Figure 7:
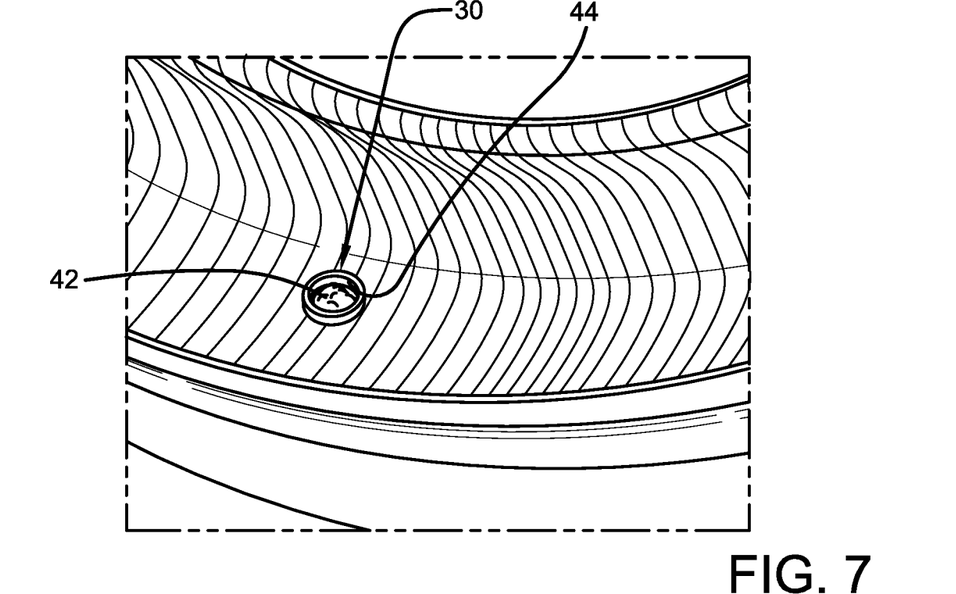
FIG. 7 is a fragmentary perspective view of the tire and attachment components shown in FIG. 5 after the application of adhesive.

Once the adhesive ring 34 has been vulcanized, it secures the compound ring 30 to the innerliner 24. Referring now to FIGS. 6 and 7, a sensor adhesive 42 is applied to the surface of the innerliner 24 in an area or reservoir 44 on the innerliner that is defined by the compound ring 30 once it is attached to the innerliner. The sensor adhesive 42 is preferably a sealant compound used for elastomeric materials, and is compatible with the tire innerliner 24 and the sensor housing 28. A sealant compound is preferred for the sensor adhesive 42, as such a compound typically exhibits sufficient tackiness to securely adhere the sensor housing 28 to the innerliner 24, while also possessing an ability to cushion the sensor 26. Depending on particular design considerations, other compounds that exhibit sufficient tackiness and cushioning ability may be employed for the sensor adhesive 42.

In order to promote crosslinking of the sensor adhesive 42 to the surface of the innerliner 24, and thus provide improved bonding of the sensor adhesive to the innerliner, the tire 10 preferably is pre-heated to a temperature of about 87 degrees C., or about 189 degrees F. before the sensor adhesive is applied to the innerliner. Once the tire 10 has been pre-heated, the sensor adhesive 42 is dispensed into the reservoir 44 by a dispensing apparatus 46 that includes a nozzle 48 that enables controlled application of the adhesive into the reservoir. A predetermined amount of sensor adhesive 42 is dispensed into the reservoir 44, and is of an amount that provides secure attachment of the sensor housing 28 (FIG. 8) to the innerliner without flowing over the compound ring 30. For example, the amount or volume of the sensor adhesive 42 preferably is similar to the volume of the sensor 26. Thus, when the volume of the sensor 26 is about 3 milliliters (ml), the volume of the sensor adhesive 42 preferably is about 3 ml. In order to prevent the sensor adhesive 42 from flowing over the compound ring 30, the maximum volume of the sensor adhesive is equal to the reservoir volume of the compound ring minus the volume of the sensor.

With reference now to FIG. 8, after the sensor adhesive 42 is dispensed into the reservoir 44, the sensor 26 is deposited in the reservoir 44 and pressed into the sensor adhesive. The compound ring 30 retains the sensor adhesive 42 in the reservoir 44, thereby preventing excess movement or migration of the sensor adhesive away from the sensor 26. Once the sensor 26 is seated in the sensor adhesive 42 in the reservoir 44 and thus secured to the innerliner 24, the tire 10 preferably is post-conditioned as known in the art until its temperature decreases to about 55 degrees C. or about 131 degrees F.

In this manner, the tire of the present invention 10 includes a post-cure vulcanized compound ring 30 that is secured to the tire innerliner 24, which forms a reservoir 44 for the sensor adhesive 26. The reservoir 44 defined by the compound ring 30 prevents the sensor adhesive 42 from flowing away from the sensor 26 when the tire 10 experiences high centrifugal forces at high vehicle speed. By retaining the sensor adhesive 42 at the sensor 26, the compound ring 30 and its reservoir 44 maintain the contact area between the sensor adhesive and the sensor, thereby ensuring sensor bonding to the tire innerliner 24 at high vehicle speeds.

Figure 9:
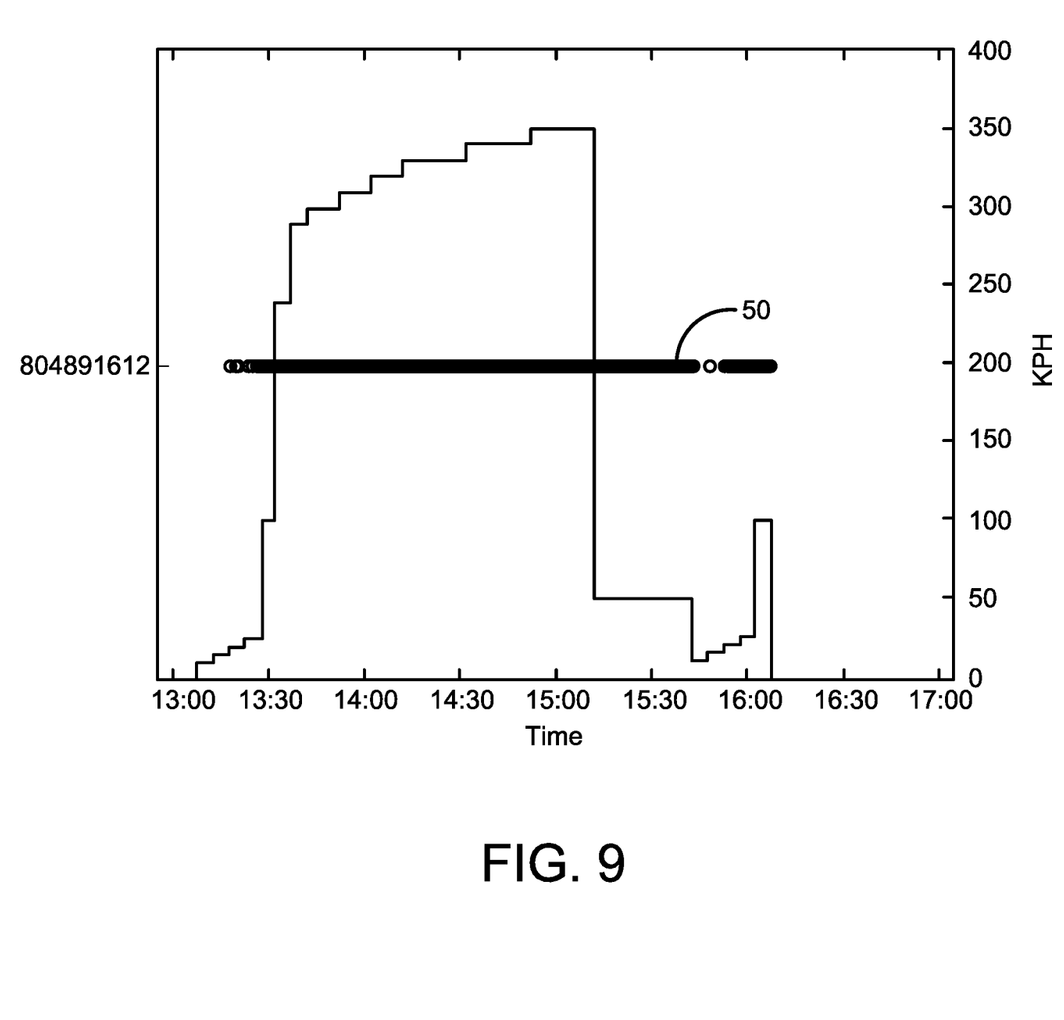
FIG. 9 is a graphical representation of test results of the exemplary embodiment of the tire of the present invention.
Figure 10:
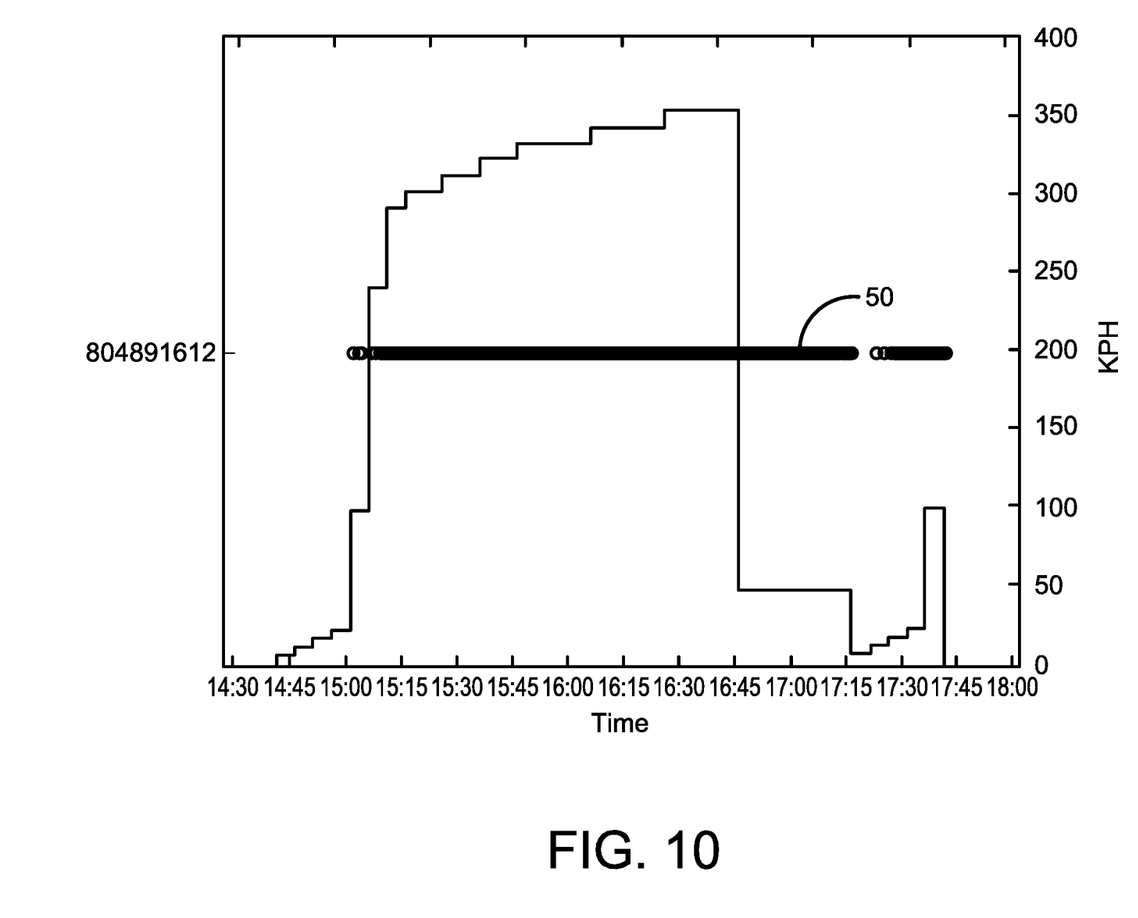
FIG. 10 is another graphical representation of test results of the exemplary embodiment of the tire of the present invention.

The robustness of the tire of the present invention 10 was subject to high-speed laboratory testing. A first test was conducted that simulated a vehicle speed of about 280 kilometers per hour (kph) or about 174 miles per hour (mph). At the conclusion of the test, the sensor 26 remained in place. Second and third tests were conducted that simulated a vehicle speed of about 350 kph or about 218 mph. The results of the second test are shown in the graph of kph versus time in FIG. 9, and the results of the third test are shown in the graph of kph versus time in FIG. 10. As indicated by a signal band 50, the sensor 26 remained operational throughout each test, and remained in place at the conclusion of each test.

The tire of the present invention 10, which includes a reservoir 44 for the sensor adhesive 42 that is defined by the compound ring 30, provides additional advantages. For example, when the sensor 26 is a piezoelectric sensor, the reservoir 44 desirably enables a piezoelectric plate of the sensor to be deformed, which allows the sensor to transmit a signal when it enters the footprint area of the tire 10 even if no pre-strain is applied to the sensor. The reservoir 44 also maintains the sensor adhesive 42 in a defined manner to provide a cushioning effect that protects the sensor 26 from shocks, desirably maintaining the integrity of the sensor throughout its service life.

The tire of the present invention 10 thus provides a structure that enables a sensor 26 to be attached to the innerliner 24 in a simple and economical manner and withstands the conditions in the tire. The structure includes a compound ring 30 that is secured to the innerliner 24 that defines a reservoir 44 which contains the sensor adhesive 42 for the attachment.

The present invention also includes a method of attaching a sensor 26 to a tire 10. The method includes steps in accordance with the description that is presented above and shown in FIGS. 1 through 10.

It is to be understood that the structure of the above-described tire 10 and/or the sensor 26 may be altered or rearranged, or components or method steps known to those skilled in the art omitted or added, without affecting the overall concept or operation of the invention. For example, the sensor 26 may be disposed at any location on the innerliner 24 of the tire 10, any number of sensors may be disposed in the tire, and other electronic structures or components may be connected to or integrated into the sensor.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire with a sensor attachment reservoir, the tire comprising:
   a pair of bead areas;
   a sidewall extending from each respective bead area to a tread;
   a carcass extending toroidally between each of the bead areas;
   an innerliner being disposed inwardly of the carcass;
   a compound ring being secured to the innerliner;
   an adhesive ring in radial alignment with the compound ring and securing the compound ring to the innerliner;
   a reservoir being defined by the compound ring, the adhesive ring, and the innerliner;
   a sensor adhesive being disposed in the reservoir and being in direct contact with the innerliner;
   a sensor being secured to the tire innerliner by the sensor adhesive; and
   the tire with the sensor attachment reservoir being free of sensor attachment structures surrounding the compound ring.

2. The tire with a sensor attachment reservoir of claim 1, wherein the compound ring includes a body, and the body provides at least 2 millimeters of clearance around a housing of the sensor.

3. The tire with a sensor attachment reservoir of claim 2, wherein a height of the body is at least half of the height of the sensor housing.

4. The tire with a sensor attachment reservoir of claim 1, wherein the adhesive ring is formed of an unvulcanized compound.

5. The tire with a sensor attachment reservoir of claim 4, wherein the adhesive ring is vulcanized on the surface of the innerliner to secure the compound ring to the innerliner.

6. The tire with a sensor attachment reservoir of claim 1, wherein the sensor is a piezoelectric sensor.

7. The tire with a sensor attachment reservoir of claim 1, wherein the sensor includes at least one of a temperature sensor, a pressure sensor, a wear sensor, a force sensor, a strain sensor and an acceleration sensor.

8. The tire with a sensor attachment reservoir of claim 1, wherein the sensor includes an integrated circuit.

9. The tire with a sensor attachment reservoir of claim 1, wherein the sensor includes an antenna.

10. The tire with a sensor attachment reservoir of claim 1, wherein the sensor includes at least one of a non-rechargeable battery, a rechargeable battery, a capacitor, a supercapacitor and an energy harvesting structure.

11. The tire with a sensor attachment reservoir of claim 1, wherein the sensor includes information for identification of the tire.

12. A method of attaching a sensor to a tire, the method comprising the steps of:
   providing a tire, the tire including:
      a pair of bead areas;
      a sidewall extending from each respective bead area to a tread;
      a carcass extending toroidally between each of the bead areas; and
      an innerliner being disposed inwardly of the carcass;
   securing a compound ring to the innerliner with an adhesive ring that is in radial alignment with the compound ring;
   defining a reservoir with the compound ring, the adhesive ring, and the innerliner;
   disposing a sensor adhesive in the reservoir, the sensor adhesive being in direct contact with the innerliner; and
   securing a sensor to the tire innerliner with the sensor adhesive, wherein the tire with the sensor attachment reservoir is free of sensor attachment structures surrounding the compound ring.

13. The method of attaching a sensor to a tire of claim 12, further comprising the step of cleaning the innerliner before securing the compound ring to the innerliner.

14. The method of attaching a sensor to a tire of claim 13, wherein the step of cleaning the innerliner includes laser cleaning the innerliner.

15. The method of attaching a sensor to a tire of claim 12, wherein the step of securing the compound ring to the innerliner includes vulcanizing the adhesive ring on the surface of the innerliner.

16. The method of attaching a sensor to a tire of claim 12, further comprising the step of pre-heating the tire before disposing the sensor adhesive in the reservoir.

17. The method of attaching a sensor to a tire of claim 12, further comprising the step of post-conditioning the tire after the step of securing the sensor to the tire innerliner.

* * * * *